United States Patent [19]

Burgess, Sr. et al.

[11] Patent Number: 5,535,898

[45] Date of Patent: Jul. 16, 1996

[54] PRINTING PLATE CARRIER

[75] Inventors: Ralph D. Burgess, Sr., Plymouth, Minn.; Dennis A. Burgess, 7205 E. Stone Canyon Dr., Tuscon, Ariz. 85715

[73] Assignee: Dennis A. Burgess, Tuscon, Ariz.

[21] Appl. No.: 444,900

[22] Filed: May 19, 1995

[51] Int. Cl.$^6$ ..................................................... A47F 5/00
[52] U.S. Cl. ............................ 211/206; 211/189; 248/165
[58] Field of Search .................................... 211/206, 204, 211/189, 195, 175, 162, 46; 280/79.3; 248/165; 15/268

[56] References Cited

U.S. PATENT DOCUMENTS

| | | | |
|---|---|---|---|
| 2,154,833 | 4/1939 | Curtiss | 211/204 |
| 2,279,325 | 4/1942 | Kaldizar | 211/189 X |
| 2,875,971 | 3/1959 | Burns | 15/268 X |
| 3,087,186 | 4/1963 | Budd | 15/268 |
| 3,130,439 | 4/1964 | Bovaird | 15/268 |
| 3,503,525 | 3/1970 | Loebner | 211/206 |
| 5,224,608 | 7/1993 | Paquette | 211/206 X |
| 5,269,418 | 12/1993 | Meissner et al. | 211/162 X |

Primary Examiner—Robert W. Gibson, Jr.
Attorney, Agent, or Firm—James V. Harmon

[57] ABSTRACT

A printing plate carrier for transporting at least one printing plate that has tabs along two opposed edges has at least one supporting bracket connected to the carrier as part of the carrier. The supporting bracket has an elongated, upwardly facing horizontal edge that acts as an elongated hook for engaging and supporting the printing plate when the tab of the printing plate is hung upon the edge of the bracket. A plurality of floor-engaging wheels are connected to the carrier to support the carrier for movement from one location to another. The carrier includes a supporting framework preferably having a pair of spaced apart upright frame members and at least one horizontal supporting beam member releasably removably connected between the upright frame members. The latter serve as supporting columns for holding the beam in place when the carrier is assembled. The beam or beams, when removed, separate the columns from one another to render the carrier collapsible so that it can be reduced in size for shipment and storage.

18 Claims, 3 Drawing Sheets

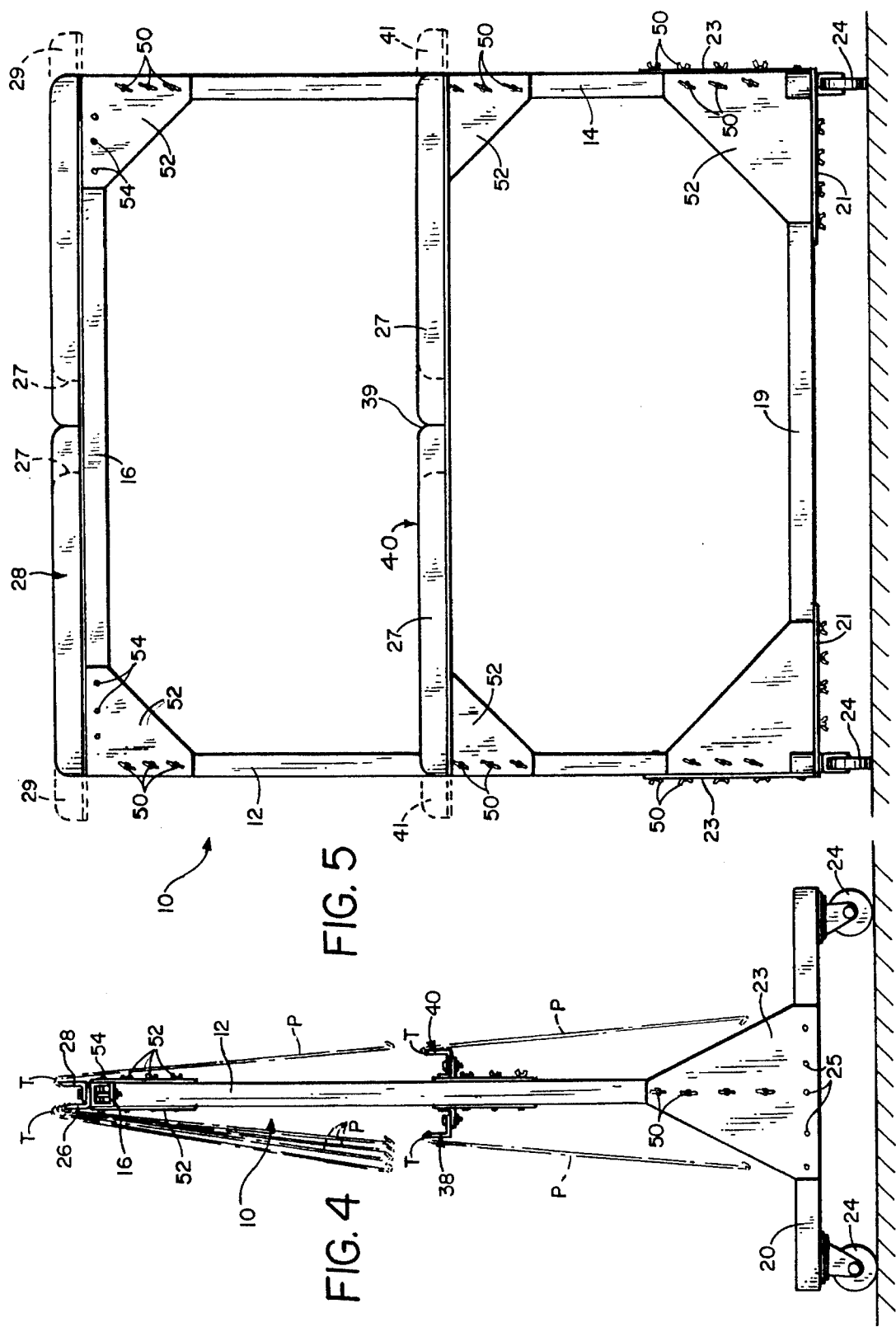

PRINTING PLATE CARRIER

FIELD OF THE INVENTION

This invention relates to printing equipment and more particularly to a carrier for transporting printing plates to or from the press room.

BACKGROUND OF THE INVENTION

A printing plate is a rectangular aluminum plate, typically 0.0 12 inch in thickness, carrying an image on one surface and having two opposite edges bent downwardly forming tabs that facilitate mounting the plate on a printing cylinder. The bent-down edges or tabs are inserted into a slot that extends longitudinally of the cylinder and are clamped firmly in place to hold the plate tightly against the outside surface of the printing cylinder. When the plates are being transported to the press room, it is important to protect them from any possible damage. If the bent down edges or tabs of the plates are harmed in any way during transit or are bent or pushed out of tolerance, or if the angle of the tab or the radius of the bend between the main portions of the plate and the tab is changed, a serious accident can result because of the high speed of the printing cylinder which has recently been increased to as much as 50 feet per second and has caused imperfect printing plates to fly from the cylinder with explosive force. Consequently, a precise fit is vitally important to keep the printing plates operating properly. Prior methods of transporting the plates have, however, exposed them to possible damage.

One carrier previously used for transporting printing plates included a series of trays stacked one above the other. During use, one printing plate is placed in a horizontal position on each of the trays. Each carrier can hold only eight or ten printing plates, and the pressman must reach in between the trays to insert or remove the plates. The lower plates are hard to reach since they are close to the floor. Consequently, this type of carrier has limited capacity, is cumbersome, and is awkward to use. In addition, the rigid structure of the carrier makes it unsuited for compact shipment and storage, and difficult and/or impossible to get through doorways separating one department from another. In another system, the plates are placed one on top of the other with slip sheets of paper between them to protect the image. The center of each successive plate arches further upward because the radius of the end tabs fit inside one another. This method of stacking the plates is time consuming and requires special care to make sure the plates or end tabs do not become bent or otherwise damaged. The hard metal surfaces of a carrier can also damage the printing plates.

In view of these and other shortcomings of the prior art, it is one object of the present invention to provide a printing plate carrier that is light in weight, occupies little space so that it is inexpensive to ship, but can reliably transport a substantial number of printing plates from the make-up room where the plates are produced to the press room where the plates are used with little chance that the plates will be damaged.

It is a further object of the invention to find a way to reduce the size of the space occupied by the carrier to facilitate compact shipment and storage and passage through standard doorways, but yet allows the carrier to be readily assembled for transporting a relatively large number, e.g., 32, printing plates during use.

It is a further object to provide an improved printing plate carrier which, although capable of carrying 32 plates or more, is still narrow enough so that it can pass through a standard door opening 30 inches wide.

These and other more detailed and specific objects of the present invention will be better understood by reference to the following figures and detailed description which illustrate by way of example but a few of the various forms of the invention within the scope of the appended claims.

SUMMARY OF THE INVENTION

This invention provides a printing plate carrier for transporting at least one printing plate that has tabs along two opposed edges. At least one supporting bracket is connected to the carrier as part of the carrier. The supporting bracket has an elongated, upwardly facing horizontal edge or lip that acts as an elongated hook for engaging and supporting the printing plate when the tab of the printing plate is hung upon the edge of the bracket. A plurality of floor-engaging wheels are connected to the carrier to support the carrier for movement from one location to another. The carrier includes a supporting framework preferably having a pair of spaced apart upright frame members and at least one horizontal supporting beam member releasably removably connected between the upright frame members. The latter serve as supporting columns for holding the beam in place when the carrier is assembled. The beam or beams, when removed, separate the columns from one another to render the carrier collapsible so that it can be reduced in size for shipment and storage.

THE FIGURES

FIG. 4 is a left end elevational view of the carrier;

FIG. 5 is a side elevational view of the carrier;

DETAILED DESCRIPTION OF THE INVENTION

Figure 1:
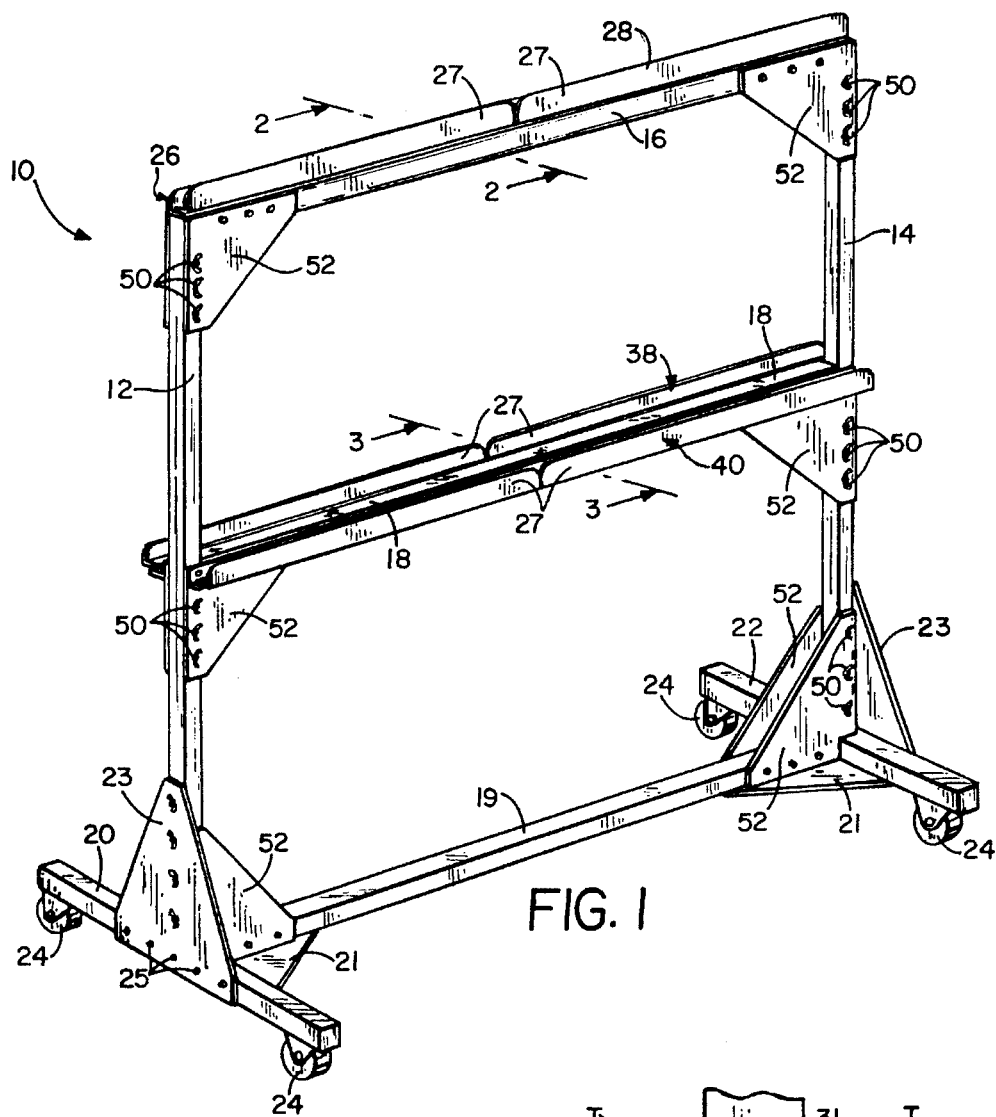
FIG. 1 is a top perspective view of the invention.

Shown in the drawings is a collapsible carrier indicated generally at 10 and including a collapsible framework composed of a pair of upright longitudinally spaced apart support posts or columns 12 and 14 connected together by vertically spaced apart longitudinally extending horizontal frame beam members, in this case three square tubes, 16, 18 and 19. Connected to the bottom of posts 12 and 14 are laterally spaced apart, horizontally extending, parallel base frame members 20 and to the ends of which are attached supporting wheels 24. Between members 20 and 22 is the bottom frame member 19. The posts 12 and 14 are rigidly secured to the base frame members 20, 22, respectively, by means of generally triangular shaped gussets 23 which are collapsibly secured to the intersecting frame members 20, 22, respectively, with suitable quick-release fasteners such as bolts and wing nuts 50. Additional gussets 21 and 52 can be secured, e.g., by bolts and wing nuts 50, between the intersecting frame members 12, 19 and 20 and the frame members 14, 19 and 22, respectively, to provide additional strength. All of the frame members 12–22 can be formed from square metal or plastic tubing such as rigid polyvinylchloride tubing measuring 1%6" square.

Figure 2:
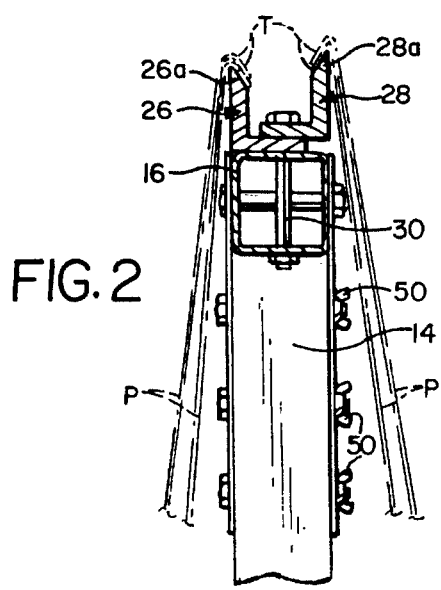
FIG. 2 is an enlarged cross-sectional view taken on line 2—2 of FIG. 1.

Supported on the beam member 16 are a pair of laterally spaced apart, horizontally extending brackets 26 and 28, each composed of two identical right angle bracket members 27 formed from plastic that include horizontally extending, laterally spaced apart, upwardly facing supporting edges or lips 26a and 28a (FIG. 2), respectively, which serve as hooks for the plates P as will be further described below. The bracket members 27 each have an L-shaped cross-section similar to an angle iron with two flat portions which intersect at a right angle, the lower ones of which are secured at the top of the beam 16 by fasteners such as bolts 30 (FIG. 2). The brackets 27 are preferably formed from non-metallic material such as plastic resin, e.g., polyvinylchloride which will not damage the plates nor will a person cut himself on the knife-like edge. Thus, the edges 26a and 28a when fabricated from plastic (PVC) provide a "cushion" that will not damage or deform the printing plate tabs T as they would if the lips were made from steel or aluminum, for example. The sharp, upwardly facing edges 26a, 28a provide support for the printing plates P. This is accomplished by hanging the downwardly bent edge tabs T over the sharp edges 26a, 28a. The carrier is unobstructed below the bracket so that a plurality of the printing plates can be hung one on top of another in stacked relationship upon the edge of the bracket The lower edges of the plates P will be fanned out where the lower tabs T contact the plate just beneath it. In this way the plates P are securely supported by the carrier 10 when they are to be moved to or from the press room.

Figure 3:
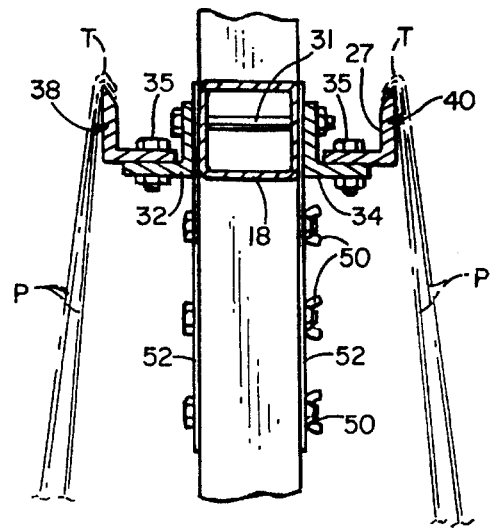
FIG. 3 is an enlarged cross-sectional view taken on line 3—3 of FIG. 1.
Figure 8:
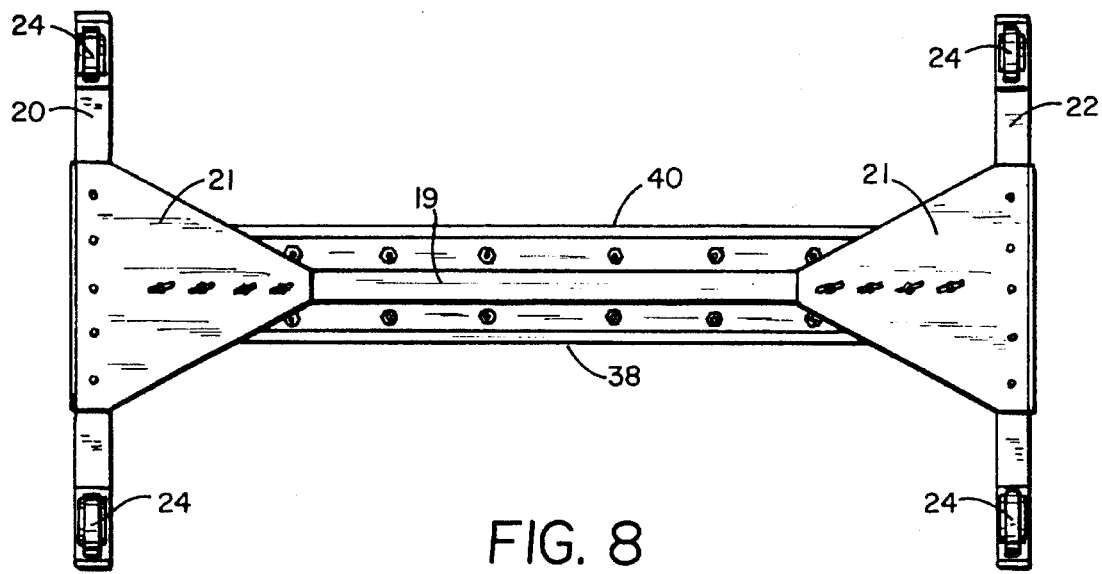
FIG. 8 is a bottom view of the invention.

Refer now to FIGS. 3 and 4. Connected by bolts 31 to the beam 18 and extending longitudinally thereof are a pair of right angle beams 32, 34 similar to angle irons but formed from either metal or plastic to which are connected by suitable fasteners such as bolts 35 a pair of laterally spaced apart, horizontally disposed brackets 38, 40 composed of the same material as bracket members 27 described above. The brackets 38, 40 are used to support additional printing plates P by hooking the tabs T over the upwardly facing free edges of the brackets 38, 40 as shown in FIG. 3. During use, as many as eight or more printing plates P can be supported by each of the brackets 26, 28 and 38, 40 with their lower ends fanned out as described above where the lower tabs T contact the next adjacent printing plate P beneath it.

The collapsibility feature of the invention will now be described, especially with reference to FIGS. 4 and 5.

Secured rigidly to the posts 12 and 14, e.g. by quick release fasteners such as wing nuts 50, are generally triangularly shaped upright gussets 52 which are arranged in laterally spaced apart pairs (FIGS. 1 and 4). The gussets 52 are thus removably secured to the columns 12 and 14 by means of the wing nuts 50 which makes it possible for the entire carrier 10 to be easily disassembled and collapsed for compact shipment and storage and then quickly reassembled for use. Disassembly is accomplished by removing the wing nuts 50 which frees the beams 16, 18 and 19 and the brackets supported by beams 16 and 18 from the posts 12 and 14. After this is done, one end portion of the carrier 10 consisting of one of the posts 12 or 14 and its connected base frame member is stacked on top of the other. The beams 16, 18 and 19 are then laid on top of them. This enables the carrier 10 to be shipped and stored in a very small space and to be easily and quickly erected without the use of tools whenever it is to be used. In addition, it can be seen with reference to FIGS. 1 and 4 that the ends of the brackets 26, 28 and 38, 40 are unobstructed. This allows the printing plates P to be much longer than the length of the carrier itself and to extend beyond the ends of the carrier 10 whenever necessary or desirable.

In a preferred form of the invention, the separation between adjacent ends of the bracket members 27 enables the bracket members 27 to be shifted away from one another along a common axis to alternate extended positions 29 and 41 (FIG. 5) from an initial overall length of, say, 48 inches to as much as, say, 60 inches or more for holding printing plates of a larger size. The separation is shown at 39 at the center of bracket 40. The bolts 30 and 35 are removed and repositioned to allow the bracket portions 27 to be moved apart in this manner. All of the brackets 26, 28 and 38, 40 are similarly constructed to enable the bracket members 27 to be moved apart from one another along a common axis and reattached to its support.

Figures 6, 7:
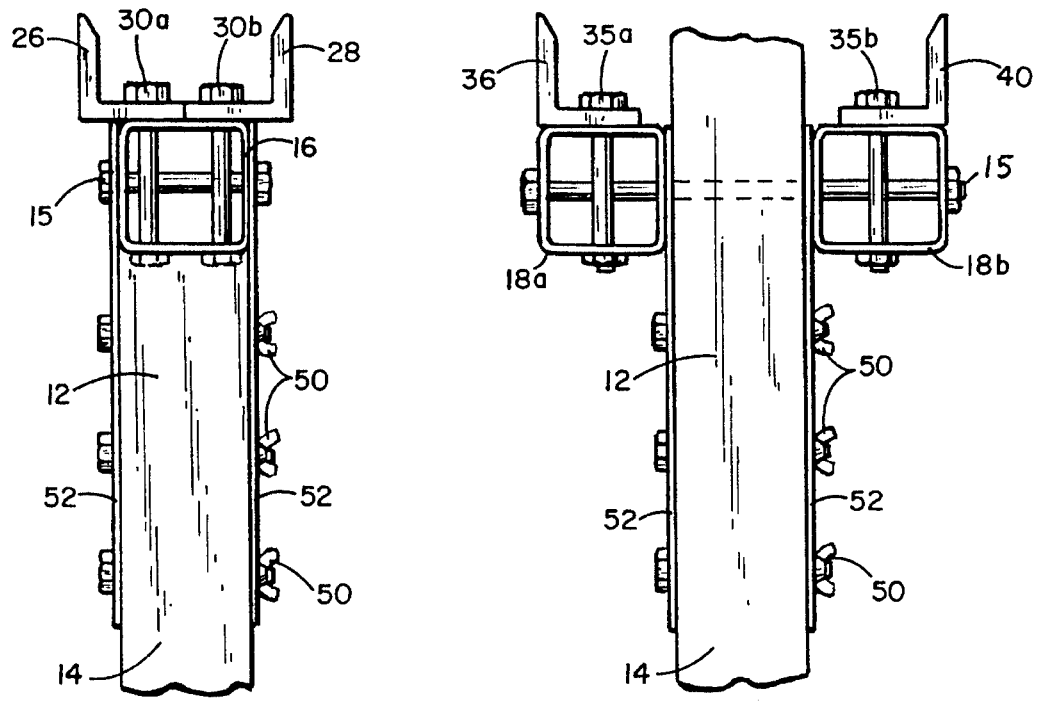
FIG. 6 is a cross-sectional view similar to FIG. 2 showing another form of the invention.
FIG. 7 is a view similar to FIG. 3 showing another form of the invention.

The embodiment of FIG. 6 is the same as FIG. 2, except that the brackets 26 and 28 are mounted side-by-side and are connected to the beam 16 by two laterally aligned sets of bolts 30a and 30b.

The embodiment of FIG. 7 is similar to that of FIG. 3 except that two beams 18a and 18b are bolted between the columns 12 and 14 in side-by-side alignment by means of fasteners such as bolts 15 at each end of the carrier 10 and the brackets 38 and 40 are bolted directly to them by bolts 35a and 35b.

It will be seen that the beams 16 and 18 are releasably and removably connected between the upright frame members 12 and 14 which serve as supporting columns for the beams when the carrier 10 is assembled. When the beams 16 and 18 are removed, the columns become separated from one another to reduce the space occupied by the carrier for shipment and storage. Each of the supporting brackets 26, 28, 38 and 40 has an elongated upwardly facing horizontal edge that acts as an elongated hook for engaging and supporting at least one of the printing plates P when the tab T is hung upon the edge or lip, e.g., the lip 26a of the bracket 26. The floor-engaging wheels 24 support the carrier for movement from one location to another so that the printing plates P can be easily and quickly transported to the press room.

The invention thus provides a collapsible printing plate carrier which can be easily and quickly assembled or disassembled so that it occupies a much smaller space for shipment and storage. It can support a large number, e.g., as many as 32 or more printing plates in such a manner that provides little chance of damaging the plates. In addition, the plates can be easily placed on the carrier 10 and removed without reaching into confined spaces. Accordingly, the carrier 10 is less cumbersome to use than one with stacked trays. Moreover, the upwardly facing plastic supporting lip of each of the brackets cannot damage the much harder material from which the plate P itself is formed. Bracket members can also be extended horizontally along a common axis beyond the ends of the carrier 10 to accommodate printing plates of larger size. In addition, the carrier 10 is very light in weight and is so narrow that it will easily pass through a standard 30-inch wide door even when carrying the usual load of 32 plates.

Many variations of the present invention within the scope of the appended claims will be apparent to those skilled in the art once the principles described herein are understood.

What is claimed is:

1. A printing plate carrier for printing plates having tabs along two opposed edges with bends between the plate and each tab, said carrier comprising, a supporting framework including a plurality of connected frame members, said framework having an upper portion and a lower portion, a plurality of floor-engaging wheels connected to the lower portion of the carrier for supporting the carrier for movement from one location to another, at least one printing plate supporting bracket on the carrier, said supporting bracket including an elongated member having an upwardly facing horizontal edge to serve as an elongated hook for engaging and supporting a printing plate by hanging a tab portion of the printing plate upon the horizontal edge of the supporting bracket such that the horizontal edge is a supporting edge for the plate, said horizontal edge of the bracket is formed to fit into the bend in the plate without damaging the plate, the bend in the plate contacts the horizontal edge of the bracket when hung thereon during use and the elongated member extends upwardly into the bend between the plate and the tab such that the plate dangles from the horizontal edge of the bracket, said carrier is unobstructed below the bracket so that a plurality of the printing plates can be hung one on top of another in stacked relationship upon the edge of the bracket, whereby a plurality of the printing plates hung on top of one another in stacked relationship from the horizontal edge of the bracket are fanned out where tabs at a lower end thereof contact a similar plate therebeneath.

2. The printing plate carrier of claim 1 wherein the frame members include at least a pair of upright columns and a plurality of horizontally disposed beam members connected between the columns, and the printing plate supporting bracket is connected to one of the beams.

3. The printing plate carrier of claim 2 wherein at least one supporting bracket is connected to each of said horizontally disposed beam members.

4. The printing plate carrier of claim 1 wherein the frame includes a pair of horizontally disposed, vertically spaced apart beam members and a pair of said brackets are connected to each of the beam members to support upper and lower stacks of printing plates on each side of the carrier.

5. The printing plate carrier of claim 1 wherein the supporting bracket comprises a vertically disposed plate and the upwardly facing horizontal edge is a sharp edge formed from plastic resin.

6. The printing plate carrier of claim 1 wherein the frame members are releasably connected together for being readily separated from one another to provide a collapsible carrier that can be disassembled for shipment and storage in a collapsed condition.

7. The printing plate carrier of claim 6 wherein the frame members are connected together by quick release fasteners to facilitate assembly and disassembly of the carrier.

8. A collapsible printing plate carrier for transporting at least one printing plate having tabs along two opposed edges with bends between the plate and each tab, said carrier comprising, a supporting framework including a pair of spaced apart upright frame members, at least one horizontal supporting beam member releasably and removably connected between the upright frame members which serve as supporting columns for the beam when the carrier is assembled and the beam, when removed, separates the columns from one another to reduce space occupied by the carrier for shipment and storage, at least one supporting bracket on the carrier, said supporting bracket having an elongated, upwardly facing horizontal edge to act as an elongated hook for engaging and supporting the printing plate when the tab of the printing plate is hung upon the edge of the bracket such that the horizontal edge is a supporting edge for the plate, said horizontal edge of the bracket is formed to fit into the bend in the plate without damaging the plate, the bend in the plate contacts the horizontal edge of the bracket when hung thereon during use and the elongated member extends upwardly into the bend between the plate and the tab such that the plate dangles from the horizontal edge of the bracket, a plurality of floor-engaging wheels connect to the carrier for supporting the carrier for movement from one location to another and a plurality of the printing plates hung on top of one another in stacked relationship from the horizontal edge of the bracket are fanned out where tabs at a lower end thereof contact a similar plate therebeneath.

9. The collapsible printing plate carrier of claim 8 wherein the carrier a second horizontally disposed beam member positioned parallel beam member and said second beam member is releasably and removably connected between said upright frame members.

10. The collapsible printing plate carrier of claim 8 wherein the support bracket includes a plate and said horizontal edge is one edge of said and said plate is supported by being connected to said horizontally disposed beam member.

11. The collapsible printing carrier of claim 10 wherein the plate comprising the bracket is separated into two portions proximate to the longitudinally along a common axis to extend the bracket lengthwise of carrier for supporting printing plates of different plates of different sizes.

12. The collapsible printing plate carrier of claim 9 wherein a second bracket is supported by being connected to said second beam member for supporting at least two printing plates upon said carrier.

13. The collapsible printing plate carrier of claim 8 wherein the carrier includes a second beam member releasably and removably supported on the carrier, and each of said beams has a pair of horizontally disposed upwardly facing printing plate-supporting edges thereon for supporting a printing plate.

14. A collapsible printing plate carrier for transporting at least one printing plate that has tabs along two opposed edges, said carrier comprising, a supporting framework including a pair of spaced apart upright frame members, a first horizontal supporting beam member releasably and removably connected between the upright frame members which serve as supporting columns for the beam when the carrier is assembled and the beam, when removed, separates the columns from one another to reduce space occupied by the carrier for shipment and storage, a second beam mounted below said beam member and positioned parallel thereto and the second beam is releasably and removably connected between the upright frame members, and each of said beams has a pair of laterally spaced apart horizontally disposed printing plate-supporting brackets connected thereto, at least one supporting bracket on the carrier, each said supporting bracket having an elongated, upwardly facing horizontal edge to act as an elongated hook for engaging and supporting the printing plate when the tab of the printing plate is hung upon the edge of the bracket, and a plurality of floor-engaging wheels connect to the carrier for supporting the cattier for movement from one location to another.

15. The collapsible printing plate carrier of claim 14 wherein the supporting bracket has a plate formed from plastic resin and said horizontal edge is one edge of said plastic plate, and said bracket is supported by being connected to one of said horizontally disposed beam members.

16. The collapsible printing plate carrier of claim 15 wherein each plate comprising the bracket is separated at a point proximate the center of the carrier into two portions and the portions of the bracket can be shifted longitudinally along a common axis to extend the bracket lengthwise of the carrier for supporting printing plates of different sizes.

17. The collapsible printing plate carrier of claim 15 wherein said bracket is supported by being connected to the first beam member and a second bracket is supported by being connected to said second beam member for supporting at least two printing plates upon said carrier.

18. The collapsible printing plate carrier of claim 1 wherein two laterally spaced brackets are connected to said carrier said brackets being located on opposite sides of the carrier for supporting at least one printing plate on each of the opposite sides of the carrier.

* * * * *

UNITED STATES PATENT AND TRADEMARK OFFICE
CERTIFICATE OF CORRECTION

PATENT NO. : 5,535,898
DATED : Jul. 16, 1996
INVENTOR(S) : Burgess Sr. et al.

It is certified that error appears in the above-indentified patent and that said Letters Patent is hereby corrected as shown below:

Col. 6, line 28 (claim 9), after "carrier" and before "a second", insert ---includes---.

Col. 6, line 29 (claim 9), after "parallel" and before "beam", insert ---to said---.

Col. 6, line 34 (claim 10), after "said" and before "and", insert ---plate---.

Col. 6, line 39 (claim 11), after "to the" and before "longitudinally", insert ---center of the carrier, and the portions of the bracket can be shifted---.

Col. 6, line 40 (claim 11), after "lengthwise of", insert ---the---.

Col. 6, line 41 (claim 11), delete "plates of different" (second occurrence) before "sizes".

Signed and Sealed this

Fifth Day of November, 1996

Attest:

BRUCE LEHMAN

*Attesting Officer*     *Commissioner of Patents and Trademarks*